United States Patent
Kozakura et al.

(10) Patent No.: US 10,025,784 B2
(45) Date of Patent: Jul. 17, 2018

(54) SIMILARITY DETERMINATION APPARATUS, SIMILARITY DETERMINATION METHOD, AND COMPUTER-READABLE RECORDING MEDIUM

(71) Applicant: FUJITSU LIMITED, Kawasaki-shi, Kanagawa (JP)

(72) Inventors: Fumihiko Kozakura, Hachioji (JP); Kouichi Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 14/967,580

(22) Filed: Dec. 14, 2015

(65) Prior Publication Data
US 2016/0210339 A1 Jul. 21, 2016

(30) Foreign Application Priority Data
Jan. 15, 2015 (JP) .................. 2015-005875

(51) Int. Cl.
*G06F 17/00* (2006.01)
*G06F 17/30* (2006.01)
*G06F 17/27* (2006.01)

(52) U.S. Cl.
CPC .... *G06F 17/30011* (2013.01); *G06F 17/2705* (2013.01); *G06F 17/3069* (2013.01)

(58) Field of Classification Search
CPC ............. G06F 17/5009; G06F 17/3025; G06F 17/3028; G06F 17/30542; G06F 17/3069
See application file for complete search history.

(56) References Cited

U.S. PATENT DOCUMENTS 6,615,209 B1 * 9/2003 Gomes .............. G06F 17/30696
2008/0195595 A1 8/2008 Masuyama et al.
(Continued)

FOREIGN PATENT DOCUMENTS

| JP | 2010-231766 | 10/2010 |
|---|---|---|
| JP | 2014-115719 | 6/2014 |
| WO | 2006-048998 | 5/2006 |

OTHER PUBLICATIONS

Extended European Search Report dated Jun. 1, 2016 for corresponding European Patent Application No. 15200078.2, 11 pages.
(Continued)

*Primary Examiner* — Truong Vo
(74) *Attorney, Agent, or Firm* — Fujitsu Patent Center

(57) ABSTRACT

A determination apparatus has a feature extraction unit and a similarity determination unit. The feature extraction unit counts a number of appearances of each keyword included in a piece of document information and deletes any arrangement including a keyword having the number of appearances less than a threshold under a condition where a number of types of keyword arrangements included in a certain range of the piece of document information is equal to or greater than a certain number and extracts, as features, a plurality of keyword arrangements from the piece of document information. The similarity determination unit determines a similarity between the different pieces of document information by comparing the features extracted from pieces of document information different from each other.

6 Claims, 22 Drawing Sheets

(56) References Cited

U.S. PATENT DOCUMENTS

2010/0223671 A1    9/2010  Tsuda
2014/0081994 A1    3/2014  Becker et al.

OTHER PUBLICATIONS

Schleimer, Saul et al.,"Winnowing: Local Algorithms for Document Fingerprinting", SIGMOD 2003, Proceedings of the ACM SIGMOD International Conference on Management of Data, San Diego, CA, Jun. 3-12, 2003, pp. 76-85, XP002366234.

Candan, K. Selcuk et al.,"Indexing, Search, and Retrieval of Sequences", Data Management for Multimedia Retrieval, Cambridge University Press, May 31, 2010, pp. 181-207, XP055272666.

Markov, Zdravko et al.,"Data Mining the Web: Uncovering Patterns in Web Content, Structure, and Usage—Chapter 1 Similarity Search", Information Retrieval and Wed Search, John Wiley & Sons, Inc., Wiley-Interscience, Hoboken, NJ, Apr. 25, 2007, pp. 36-43, XP055272324.

European Office Action dated Nov. 30, 2017 for corresponding European Patent Application No. 15200078.2, 12 pages.

* cited by examiner

|  | SECOND | |
|---|---|---|
|  | KEYWORD H (50%) | KEYWORD L (50%) |
| FIRST KEYWORD H (50%) | FEATURE H-H (25%) | FEATURE H-L (25%) |
| FIRST KEYWORD L (50%) | FEATURE L-H (25%) | FEATURE L-L (25%) |

FIG.8

|  |  | SECOND | |
|---|---|---|---|
|  |  | KEYWORD H (50%) | KEYWORD L (50%) |
| FIRST | KEYWORD H (50%) | FEATURE H-H (1) | FEATURE H-L (K) |
| | KEYWORD L (50%) | FEATURE L-H (K) | FEATURE L-L ($K^2$) |

FIG.9

| H:L RATIO | 100:0 | 50:50 | 30:70 | 10:90 |
|---|---|---|---|---|
| REDUCTION RATE | 0% | 42% | 62% | 88% |
| AVERAGE SIMILARITY OF SECOND TO FIFTH | 8.8% | 7.3% | 7.2% | 9.5% |

FIG.16

| DATE AND TIME | TYPE | HOST | ACCOUNT | FIRST FILE NAME | SECOND FILE NAME | LOG ID |
|---|---|---|---|---|---|---|
| 2014-05-22 09:10:32 | UPDATE | 10.0.1.5 | ICHIRO | /home/plan | | L101 |
| 2014-05-22 09:15:20 | DELETION | 10.0.1.6 | JIRO | /home/report | | |
| 2014-05-22 09:21:02 | GENERATION | 10.0.1.7 | SABURO | /home/design_document | | L102 |
| 2014-05-22 09:21:02 | COPY | 10.0.1.8 | SHIRO | /share/specification_sheet | /home/proposal | |
| 2014-05-22 09:30:35 | UPDATE | 10.0.1.8 | SHIRO | /home/proposal | | L103 |
| 2014-05-22 09:32:35 | PRINT | 10.0.1.8 | SHIRO | /home/proposal | | L104 |
| ... | ... | ... | ... | ... | ... | ... |

FIG.17

| LOG ID | TEXT DATA |
|---|---|
| L101 | TEXT DATA OF LOG ID, "T101" |
| L102 | TEXT DATA OF LOG ID, "T102" |
| ... | ... |

FIG.18

| LOG ID | LIST (FP) |
|---|---|
| L101 | 48742842, 28367522, ··· |
| L102 | 28367522, 58921973, ··· |
| L103 | 37492381, 58921973, ··· |
| ··· | ··· |

| VALIDITY GRAPH (FEATURE) | LOG ID |
|---|---|
| 48742842 | L101, L103, ··· |
| 28367522 | L101, L102, ··· |
| 58921973 | L102, L103, ··· |
| 37492381 | L103, L104, ··· |
| ··· | ··· |

| ACCOUNT | FILE NAME | SIMILARITY | TYPE | DATE AND TIME |
|---|---|---|---|---|
| SHIRO | /home/proposal | 0.8 | PRINT | 2014-05-22 09:32:35 |
| SHIRO | /home/proposal | 0.8 | UPDATE | 2014-05-22 09:30:35 |
| SHIRO | /share/specification_sheet | 0.7 | COPY | 2014-05-22 09:21:02 |

SIMILARITY DETERMINATION APPARATUS, SIMILARITY DETERMINATION METHOD, AND COMPUTER-READABLE RECORDING MEDIUM

CROSS-REFERENCE TO RELATED APPLICATION(S)

This application is based upon and claims the benefit of priority of the prior Japanese Patent Application No. 2015-005875, filed on Jan. 15, 2015, the entire contents of which are incorporated herein by reference.

FIELD

The embodiments discussed herein are related to a similarity determination apparatus, and the like.

BACKGROUND

At present, enterprises investigate causes of information leakage by collecting various logs for information leakage countermeasures. For example, one approach is to select a file similar to information that has been leaked and to investigate a cause of the information leakage. In order to perform this investigation, with respect to a log obtained upon file operation, such as document browsing or storage, rather than the original text of the investigated file, features of the file are obtained as a fingerprint representing features of the original test. Hereinafter, a finger print or fingerprinting will be denoted as "FP".

For example, if a file including confidential information of a company secret is found, by comparing the FP of that file with FPs registered in a browsing log file in the company, a file similar to the leaked file is able to be retrieved from the log. Further, by following the operation history of the file in the log similar to the leaked information, the cause of the information leakage is able to be identified, too.

FP will be described specifically. FP is a technique for extracting features of a file. FIG. 27 is a diagram illustrating FP. For example, keywords and their arrangements are extracted from a text in a file, and arrangements with directions of the keywords in a specific range are obtained as characters. For example, if there is a first text, "Keyword 1 is a keyword 2, a keyword 3, and a keyword 4.", features of that first text will be six pairs of keywords, as illustrated by features 10a in FIG. 27.

In FP, a similarity between texts is determined based on the number of matches between their features. For example, it is assumed that features of a second text are features 10b in FIG. 27. When the features 10a of the first text are compared with the features 10b of the second text, of the five pairs of keywords included in the features 10b, four pairs of keywords match the pairs of keywords of the features 10a. Specifically, "keyword 1→keyword 2", "keyword 1→keyword 3", "keyword 1→keyword 4", and "keyword 3→keyword 4" match. It can be said that the greater the number of these matches is, the more similar the texts are to each other.

When the features are treated as data, the keywords are difficult to be treated as they are. Therefore, by making the keywords into hashes and executing remainder operation (mod) with a constant n to obtain hash values with a narrowed range, the features of the text are represented by a validity graph of n×n. Hereinafter, a hash value will be defined as a value that has been subjected to mod with the constant n. The hash value before being subjected to mod will be defined as an intermediate hash value.

For example, if keywords are made into hashes with the value of n being set to about 10000, the same hash values may be obtained for different keywords and the accuracy may be reduced. However, since the features are in pairs of keywords, even if the same hash values are obtained for different keywords to some extent, the probability that both values of the pairs of keywords included in the features of different texts will be converted to the same hash values is low.

FIG. 28 is a diagram illustrating an example of a process of determining a similarity with validity graphs of n×n. An FP 11a in FIG. 28 represents an FP of a text A in an n×n validity graph. An FP 11b in FIG. 28 represents an FP of a text B in an n×n validity graph. For example, it is assumed that the text A includes a pair of keywords, "keyword 1→keyword 2", a hash value of the keyword 1 is "0", and a hash value of the keyword 2 is "2". In this case, for the FP 11a, a value of a portion at which the row of "0" and the column of "2" intersect each other is set to "1".

By taking an AND between the FP 11a and the FP 11b, a comparison result 11c is obtained. The number of "1" s included in the comparison result 11c will be a value indicating a similarity between the text A and the text B. In the example illustrated in FIG. 28, the similarity between the text A and the text B is "4". These related-art examples are described, for example, in Japanese Laid-open Patent Publication No. 2010-231766, Japanese Laid-open Patent Publication No. 2014-115719 and International Publication Pamphlet No. WO 2006/048998

By the above described conventional technique, for one-to-one comparison between texts, for example, as described with respect to FIG. 28, by taking an AND between their FPs, a similarity therebetween is able to be determined. On the contrary, if a text similar to leaked information is retrieved from plural files in a log, one-to-many comparison among texts will be performed. In this case, instead of repeating one-to-one comparison, in general, comparison of the respective texts is performed by use of a transposition index.

FIG. 29 is a diagram illustrating comparison by use of a transposition index. In FIG. 29, an FP 12 represents an FP of a retrieval text. Each feature included in the FP 12 is a hash value calculated from a pair of keywords included in the retrieval text. A transposition index 13 is a transposition index of plural texts included in a log, and associates their features with document identifiers. The features of the transposition index 13 are the hash values calculated from the pairs of keywords included in the texts. The document identifiers are information uniquely identifying the texts. For example, the first line of the transposition index 13 indicates that each of files identified by the document identifiers, "001, 003, 007, . . . ", has the feature, "484893".

When the FP 12 and the transposition index 13 are compared with each other, a comparison result 14 is obtained. For example, the comparison result 14 associates the document identifiers with amounts of the features. Of these, an amount of feature represents the number of features in the features included in the corresponding text, the number of features matching the retrieval text FP 12, and the greater the amount of features is, the higher the similarity is.

If the amount of data handled with the transposition index exceeds the amount of data of the main storage, in accordance with the increase in the amount of data, the retrieval cost is increased. If data in the transposition index are simply deleted, the feature portion of the texts may be lost, reducing the retrieval accuracy. Therefore, there is a demand for the reduction in the amount of data without the reduction in the determination accuracy.

SUMMARY

According to an aspect of an embodiment, a similarity determination apparatus includes a processor that executes a process including: counting a number of appearances of each keyword included in a piece of document information; deleting any arrangement including a keyword having the number of appearances less than a threshold under a condition where a number of types of keyword arrangements included in a certain range of the piece of document information is equal to or greater than a certain number; extracting, as features, a plurality of keyword arrangements from the piece of document information; and determining a similarity between the different pieces of document information by comparing the features extracted from pieces of document information different from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram (2) illustrating percentages of pairs of keywords forming features;
FIG. 9 is a diagram illustrating an example of a relation between ratios and reduction rates;
FIG. 16 is a diagram illustrating an example of a data structure of a file operation log;
FIG. 17 is a diagram illustrating an example of a data structure of a text table;
FIG. 18 is a diagram illustrating an example of a data structure of a list table;
FIG. 19 is a diagram illustrating an example of a data structure of a transposition index;
FIG. 21 is a diagram illustrating an example of a retrieval result.

DESCRIPTION OF EMBODIMENT(S)

Preferred embodiments of the present invention will be explained with reference to accompanying drawings. The invention is not limited by these embodiments.

Figure 1:
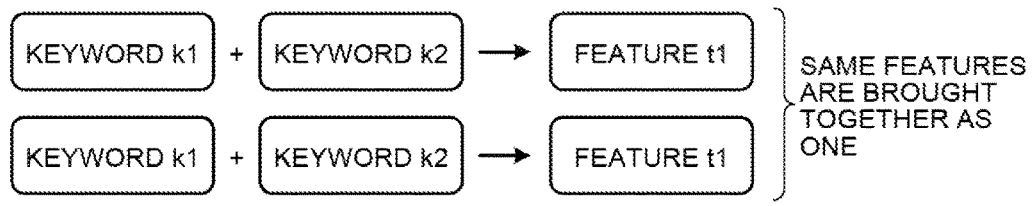
FIG. 1 is a diagram (1) illustrating characteristics of FP.
Figure 2:
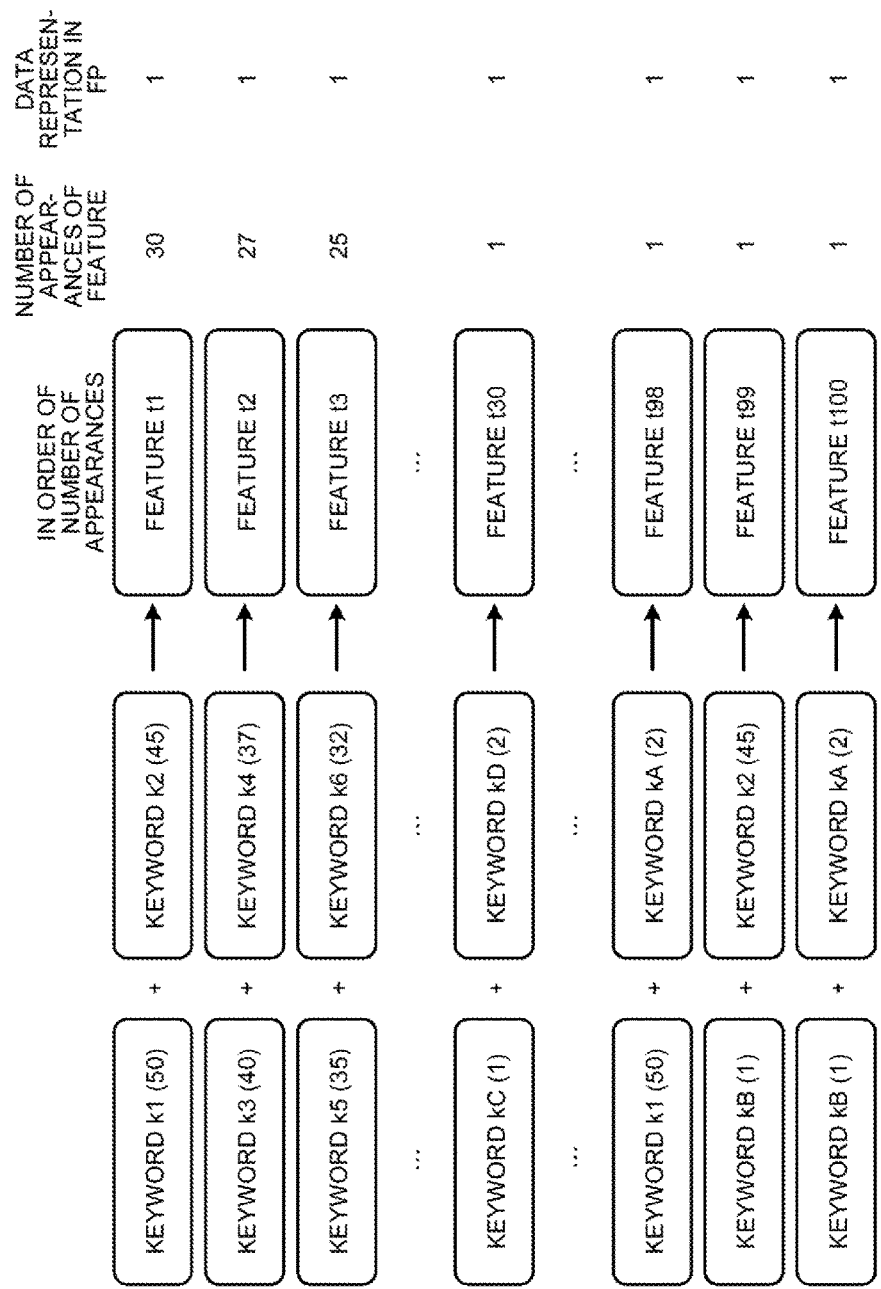
FIG. 2 is a diagram (2) illustrating characteristics of FP.

Determination of finger prints will be described. Hereinafter, a finger print or fingerprinting will be denoted as "FP". FIG. 1 to FIG. 4 are diagrams illustrating characteristics of FP. For example, as illustrated in FIG. 1, if the number of appearances of a feature t1 formed of a keyword k1 and a keyword k2 is plural, the appearances are brought together as one. Therefore, a feature representing an arrangement of keywords has its numbers of appearances, but data of the FP are rounded into information as illustrated in FIG. 2 and the information of the number of appearances is deleted.

In FIG. 2, the number in brackets next to each keyword indicates the number of appearances of that keyword included in the text. For example, "keyword k1 (50)" indicates that the number of appearances of the keyword k1 included in the text is 50 times.

The number of appearances of a features illustrated in FIG. 2 indicates the number of times the arrangement of keywords included in the text appears. For example, FIG. 2 illustrates that the arrangement of the keyword k1 and keyword k2 corresponding to the feature t1 appears 30 times in the text. In the data of the FP, information of the number of appearances is deleted, and the numbers of appearances are not distinguished among the features. In the example illustrated in FIG. 2, the respective features are arranged in descending order of the numbers of appearances of the features.

Figure 3:
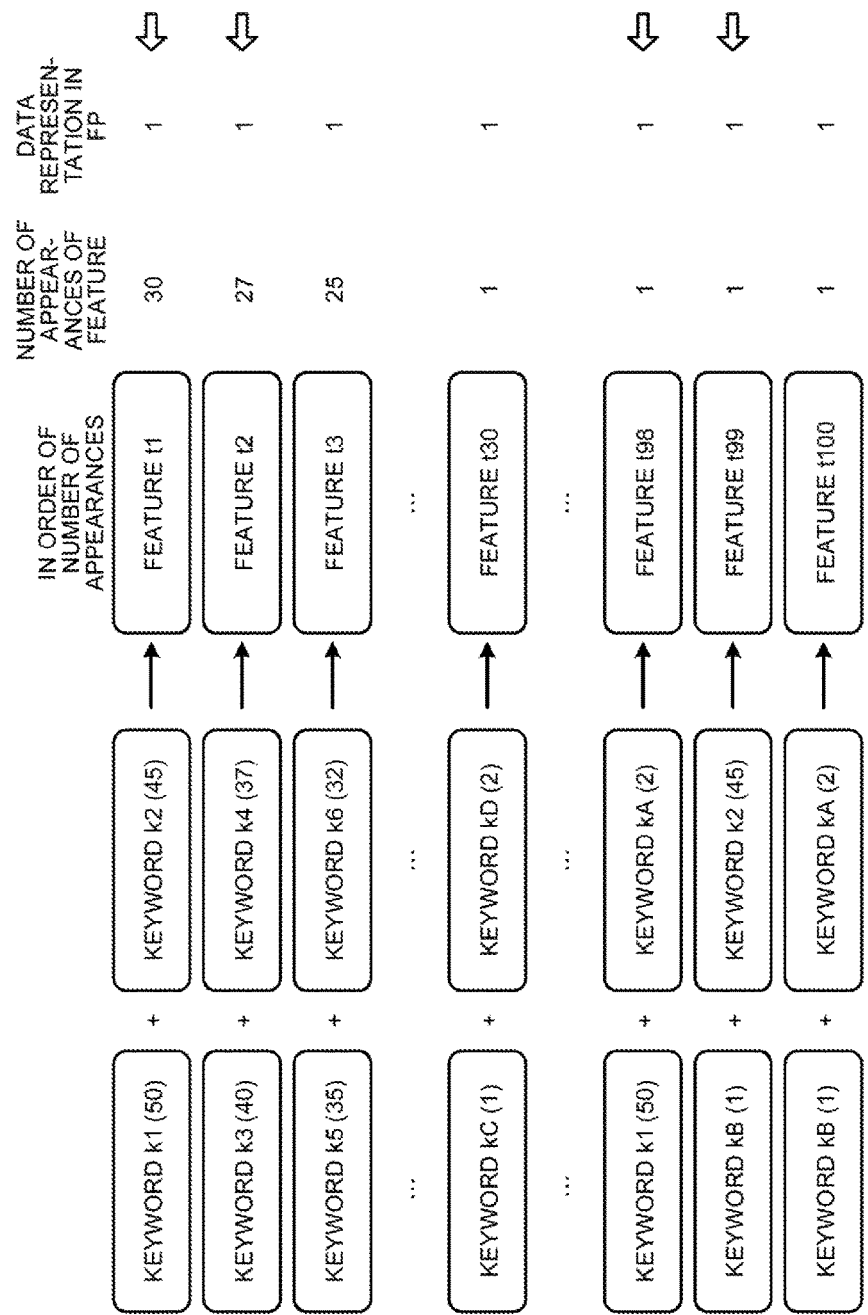
FIG. 3 is a diagram (3) illustrating characteristics of FP.

A method of randomly executing deletion from the FP can be thought of as the simplest method of reducing information of the FP from the state illustrated in FIG. 2. FIG. 3 illustrates a case of deleting features from the FP randomly. For example, in the example illustrated in FIG. 3, the features t1, t2, t98, and t99 are randomly selected and deleted. However, when the features are randomly selected and deleted, features that appear many times may be deleted, and thereby, many features are likely to be lost. For example, since the number of appearances of the feature t1 in FIG. 3 is greater than those of the other features, that feature t1 can be said to be a main feature of the text. However, if the feature t1 is selected and deleted, the main feature of the text will be lost from the FP.

Figure 4:
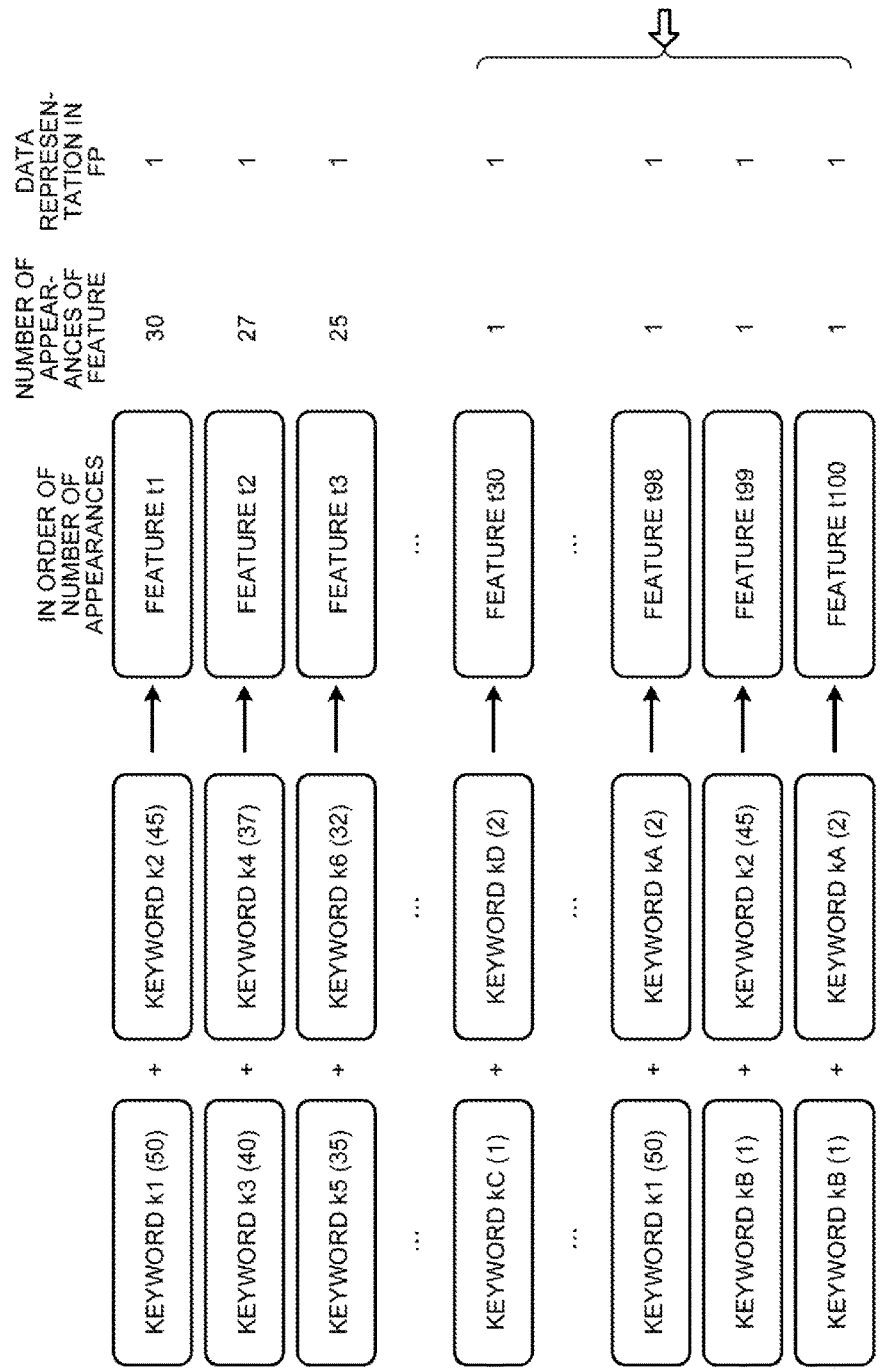
FIG. 4 is a diagram (4) illustrating characteristics of FP.

In order to solve the problem described with reference to FIG. 3, a method illustrated in FIG. 4 may be considered. For example, one method is to delete features that do not appear many times, rather than features that appear many times. In this case, although features that appear many times are able to be left and features including keywords with the small numbers of appearances are deleted, these features with the small numbers of appearances are often features representing the differences from other texts. Therefore, if the features with the small numbers of appearances are simply deleted, similarities among the texts are increased, and accuracy for determining similarity is reduced.

Next, an example of processing by a determination apparatus according to the embodiment will be described. The determination apparatus is an example of the similarity determination apparatus. The determination apparatus reduces an amount of data of an FP without reducing accuracy of similarity determination, by deleting features including keywords with the small numbers of appearances while leaving features including keywords with the small numbers of appearances.

Figure 5:
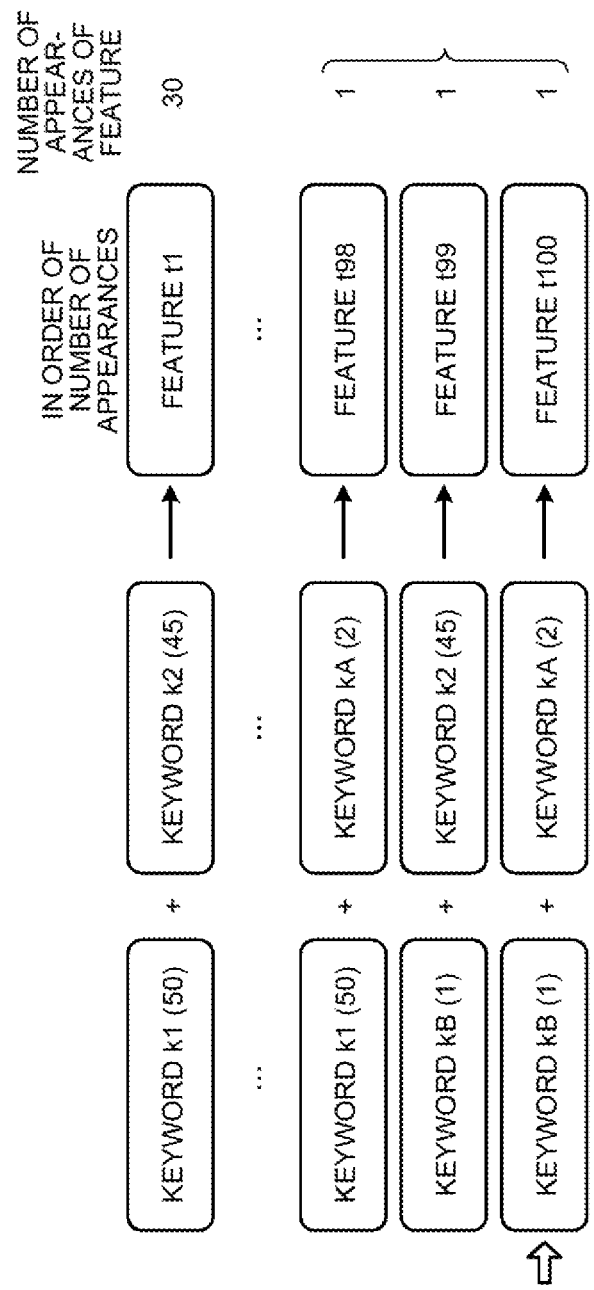
FIG. 5 is a diagram (1) illustrating processing by a determination apparatus according to an embodiment.

FIG. 5 is a diagram illustrating the processing by the determination apparatus according to the embodiment. As illustrated in FIG. 5, the determination apparatus selects, based on the numbers of appearances of features, the features t98, t99, and t100 as candidates for a target to be deleted, the features t98, t99, and t100 having the numbers of appearances equal to or less than a threshold. The determination apparatus deletes, from the features of the candidates for a target to be deleted, any feature having a keyword that is able to be complemented by another feature even if the feature is deleted.

For example, in the example illustrated in FIG. 5, the keyword kB of the feature t100 is present in the feature t99. The keyword kA of the feature t100 is present in the feature t98. Since the keywords that the feature t100 has are able to be complemented by the other features t98 and t99, the determination apparatus deletes the feature t100.

The example has been described, where in the processing by the determination apparatus illustrated in FIG. 5, the features having the numbers of appearances equal to or less than the threshold are obtained as the candidates for a target to be deleted, and any feature that is able to be complemented by another feature is deleted from the features of the candidates for a target to be deleted. This processing is good in that the amount of data is reduced but since the target to be deleted is finely checked, the processing load may become large. Hereinafter, an example of processing by the determination apparatus will be described, the processing omitting the process of finely checking the target to be deleted, with the same approach as that of the processing described with reference to FIG. 5.

In the processing described with reference to FIG. 5, the features to be deleted are narrowed down based on the numbers of appearances of the features, but processing may be executed by focusing on the numbers of appearances of the keywords. The determination apparatus counts the numbers of appearances of keywords appearing in a text, keyword by keyword, and based on the numbers of appearances, classifies the keywords into a group H or a group L.

Figures 6, 7:
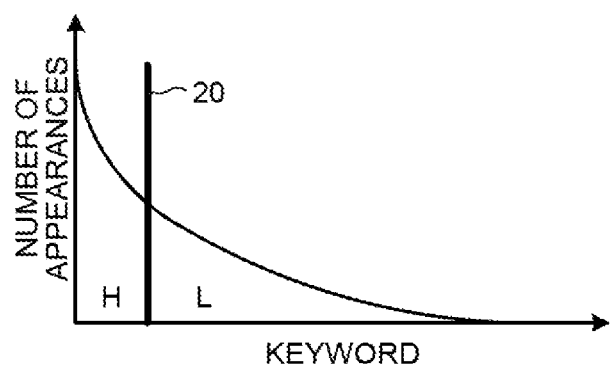
FIG. 6 is a diagram illustrating a relation between keywords and their numbers of appearances.
FIG. 7 is a diagram (1) illustrating percentages of pairs of keywords forming features.

FIG. 6 is a diagram illustrating a relation between the keywords and the numbers of appearances. In FIG. 6, the vertical axis represents the number of appearances and the horizontal axis corresponds to the keywords. For example, the keywords are arranged from the left to the right in descending order of the numbers of appearances. The keywords on the left side of a division point 20 in FIG. 6 belong to the group H. The keywords on the right side of the division point 20 belong to the group L. The determination apparatus sets the division point 20 such that the numbers of appearances become even. For example, the determination apparatus sets the division point 20 such that a total of the numbers of appearances of the respective keywords belonging to the group H equals a total of the numbers of appearances of the respective keywords belonging to the group L. In the following description, a keyword belonging to the group H will be denoted as a keyword H, and a keyword belonging to the group L will be denoted as a keyword L, as appropriate.

As illustrated in FIG. 6, when the keywords are classified, the features of the FP are able to be evenly divided into four groups as illustrated in FIG. 7. FIG. 7 and FIG. 8 are diagrams illustrating percentages of the pairs of keywords forming the features. For example, a feature representing an arrangement of a keyword H and a keyword H is denoted as a feature H-H. A feature representing an arrangement of a keyword H and a keyword L is denoted as a feature H-L. A feature representing an arrangement of a keyword L and a keyword H is denoted as a feature L-H. A feature representing an arrangement of a keyword L and a keyword L is denoted as a feature L-L.

As illustrated in FIG. 7, the percentage of features H-H is 25% of all of the features. The percentage of features H-L is 25% of all of the features. The percentage of features L-H is 25% of all of the features. The percentage of features L-L is 25% of all of the features.

For example, by the determination apparatus deleting the features L-L, 25% of the information of the FP will be deleted. Further, if it is interpreted that the keywords L included in the features L-L are included in the features H-L or features L-H, even if the features L-L are deleted, the features of the text will be maintained. For example, since the features are not simply deleted based on the numbers of appearances as described with reference to FIG. 4, keywords specific to the text are able to be left and reduction in accuracy of the similarity determination is able to be suppressed.

Practically, coefficients representing differences between unique numbers are different from each other between a keyword H and a keyword L. If a coefficient is K, the percentages of the features H-H, H-L, L-H, and L-L will be as those illustrated in FIG. 8. For example, if the features L-L are deleted, a reduction of K×2/(1+K)×2% is achieved. For example, if the value of K is "3", a deletion of 56% is able to be expected. If the value of K is "4", a deletion of 65% is able to be expected.

A relation between the ratio of the number of keywords H to the number of keywords L and the reduction rate will be described. FIG. 9 is a diagram illustrating an example of the relation between the ratio and the reduction rate. In order to find the reduction rate, the inventors actually prepared 1000 texts, each text having a size of 3 to 4 KB, and generated FPs with the 1000 texts. The inventors found the reduction rates by changing the ratios for the generated FPs. Further, similarity was found by comparing the respective FPs corresponding to the 1000 texts, and an average similarity of the second to fifth highest similarities was found. The highest similarity is a similarity resulting from comparison with the own text and is thus omitted.

As illustrated in FIG. 9, when the ratio of the number of keywords H to the number of keywords L is "100:0", the reduction rate is 0% and the average similarity is 8.8%". When the ratio of the number of keywords H to the number of keywords L is "50:50", the reduction rate is 42% and the average similarity is "7.3%". When the ratio of the number of keywords H to the number of keywords L is "30:70", the reduction rate is 62% and the average similarity is "7.2%".

When the ratio of the number of keywords H to the number of keywords L is "10:90", the reduction rate is 88% and the average similarity is "9.5%".

In the example illustrated in FIG. 9, it was confirmed that even if the reduction rate was increased by changing the ratio to delete more features, the features of the texts tended to be evenly deleted. However, when features are deleted by use of this algorithm, evaluation of partial matching is difficult to be executed. This is because although the features to be deleted are determined for the text as a whole, in a local range of the text, a portion with more features to be deleted and a portion with less features to be deleted are generated.

Figure 10:
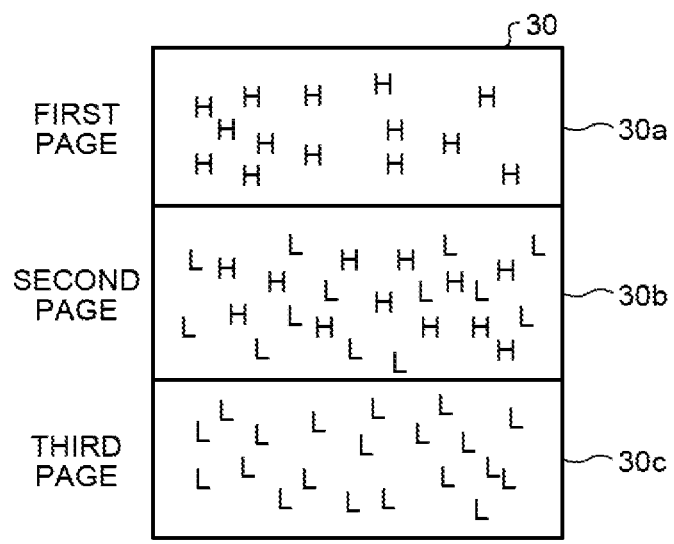
FIG. 10 is a diagram illustrating an example of distributions of keywords H and keywords L that are included in a text.

FIG. 10 is a diagram illustrating an example of distributions of keywords H and keywords L included in a text. In the example illustrated in FIG. 10, an example in which a text 30 has been divided into pages is illustrated. For example, an area 30a is an area of the first page. An area 30b is an area of the second page. An area 30c is an area of the third page. The area 30a includes many of keywords H and does not include any of keywords L. The area 30b includes keywords H and keywords L in good balance. The area 30c includes many of keywords L and does not include any of keywords H.

If features L-L are deleted, for example, in the area 30c, many keywords L will be deleted, and the area 30c will have no features left. Therefore, it becomes difficult to execute the evaluation of partial matching. In order to solve this point, the determination apparatus according to this embodiment controls a process of deleting features L-L, over the entire area of the text, such that a certain number of features will be left in a certain range. For example, if there is a certain range where the number of features is less than a certain number when the determination apparatus deletes all of the features L-L, the determination apparatus will not delete a part of the features L-L that have been planned to be deleted, for that certain range.

Figure 11:
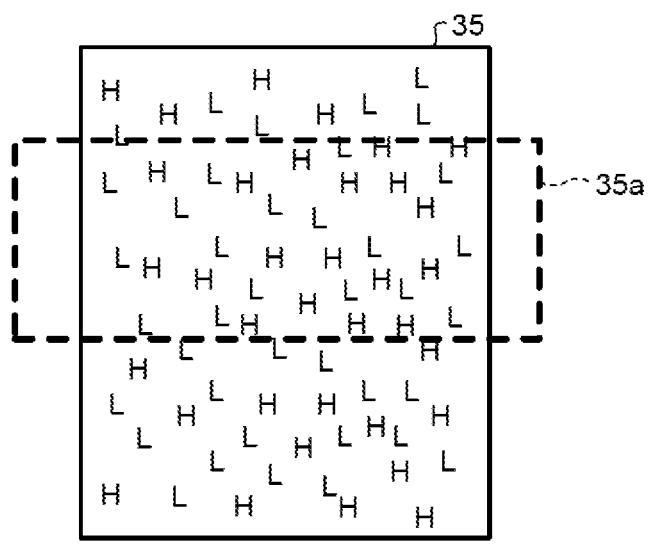
FIG. 11 is a diagram (2) illustrating processing by the determination apparatus according to the embodiment.

FIG. 11 is a diagram (2) illustrating processing by the determination apparatus according to the embodiment. The determination apparatus sets a certain range 35a on a text 35 and counts the number of remaining features upon deletion of features L-L. The determination apparatus leaves a part of the features L-L that have been planned to be deleted, if the number of features counted is less than a predetermined number. The determination apparatus repeatedly executes the above processing while shifting the certain range 35a.

Figure 12:
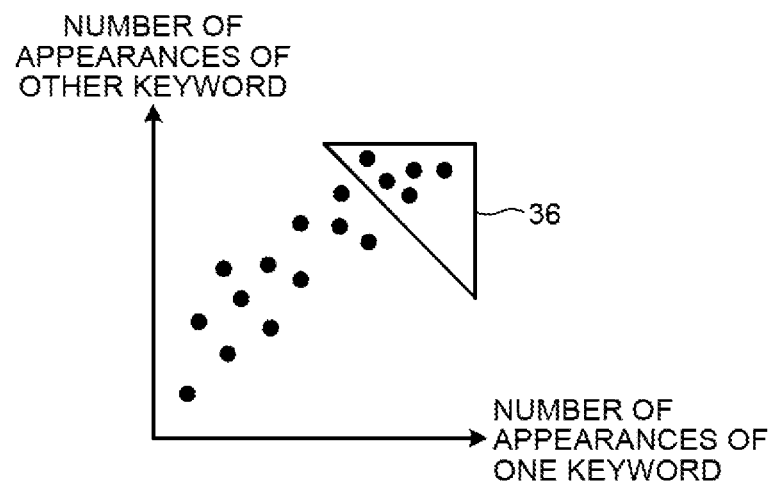
FIG. 12 is a diagram illustrating features L-L to be left.

The determination apparatus identifies, based on the numbers of appearances of keywords L forming the features L-L, the features L-L to be left. FIG. 12 is a diagram illustrating the features L-L to be left. In FIG. 12, the horizontal axis represents, for a pair of the keywords L forming a feature L-L, the number of appearances of one of the keywords L and the vertical axis represents the number of appearances of the other one of the keywords L. For example, the vertical axis represents the number of appearances of a keyword L having the larger number of appearances, of the pair of keywords L.

For example, the determination apparatus leaves, of all of the features L-L, features L-L having the large numbers of appearances of their pairs of keywords L. In the example illustrated in FIG. 12, the determination apparatus leaves features L-L having pairs of keywords L included in the area 36, and deletes the other features L-L. By the determination apparatus executing such processing, while leaving the overall features of a text, minimum partial features are able to be left and reduction in accuracy of similarity determination is able to be suppressed.

Figure 13:
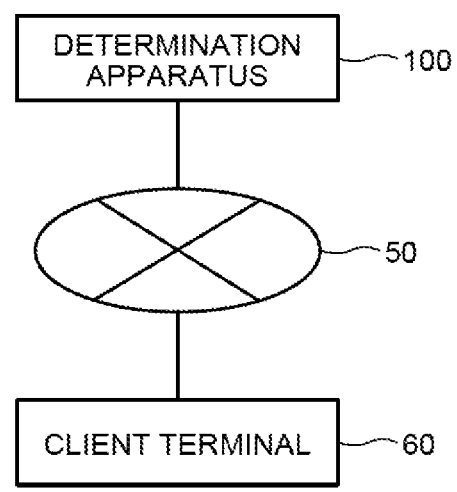
FIG. 13 is a diagram illustrating a configuration of a system according to the embodiment.

Next, a configuration of a system according to this embodiment will be described. FIG. 13 is a diagram illustrating the configuration of the system according to this embodiment. As illustrated in FIG. 12, this system has a client terminal 60 and a determination apparatus 100. The client terminal 60 and the determination apparatus 100 are connected to each other via a network 50.

The client terminal 60 is an information device operated by an investigator who investigates a cause of information leakage. For example, if a retrieval file is specified by the investigator, the client terminal 60 generates an FP of a text included in the retrieval file, and notifies the determination apparatus 100 of information of the generated FP.

Figure 14:
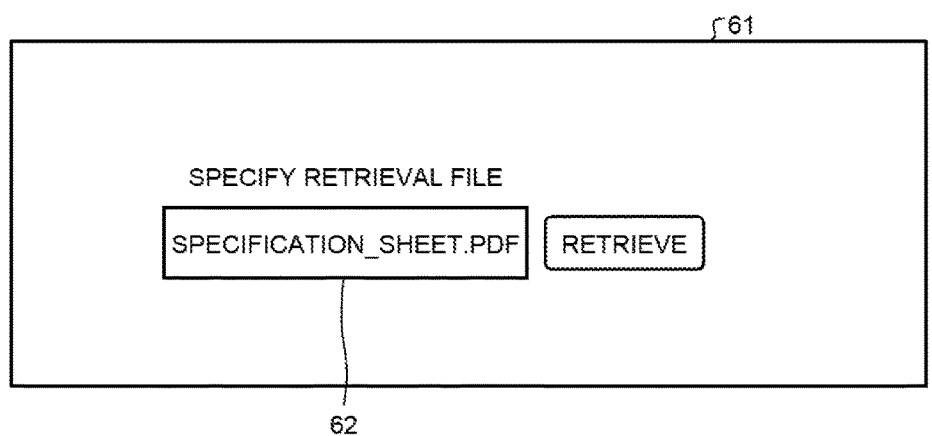
FIG. 14 is a diagram illustrating an example of a retrieval input screen.

For example, the client terminal 60 displays a retrieval input screen and receives the specification of the retrieval file. FIG. 14 is a diagram illustrating an example of the retrieval input screen. The investigator operates the client terminal 60 to input a name of the retrieval file in an input area 62 of a retrieval input screen 61. Upon reception of the specification of the retrieval file, the client terminal 60 obtains the retrieval file from a database of the client terminal 60 or from the network, and generates an FP based on the obtained retrieval file.

An example of a process, by the client terminal 60, of generating an FP from a text of a retrieval file, will be described. By scanning the text, the client terminal 60 extracts keywords included in the text. The client terminal 60 identifies arrangements of the respective keywords as features. As described with reference to FIG. 1, the client terminal 60 brings features having the same arrangement of keywords together into one feature.

The client terminal 60 calculates a value of a feature by combining: a value obtained by making one of the keywords included in the feature into a hash and executing mod with a constant n; with a value obtained by making the other one of the keywords included in the feature into a hash and executing mod with the constant n. The client terminal 60 repeatedly executes the above processing for the respective features extracted from the text and generates a list bringing together values of these features. This list becomes an FP of the text included in the retrieval file.

The determination apparatus 100 is an apparatus, which retrieves a text similar to the retrieval file, from a database or the like in a company, based on the FP of the retrieval file, when the determination apparatus 100 receives information of the FP of the retrieval file from the client terminal 60. The determination apparatus 100 notifies the client terminal 60 of a result of the retrieval.

Figure 15:
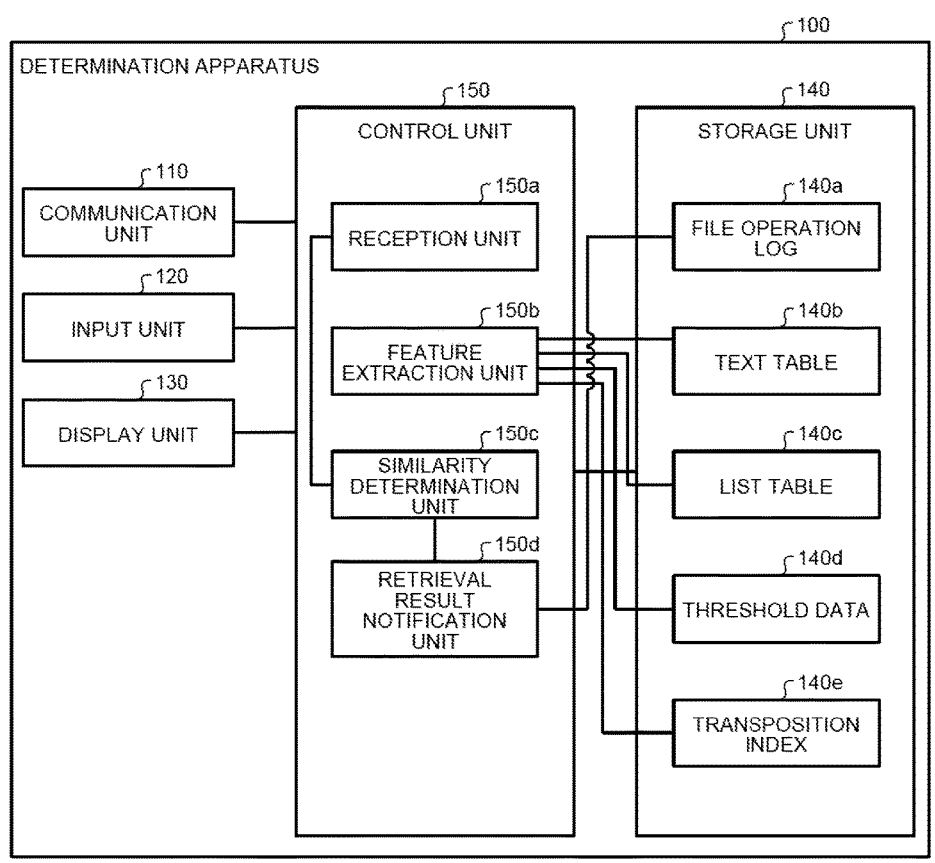
FIG. 15 is a functional block diagram illustrating a configuration of the determination apparatus according to the embodiment.

FIG. 15 is a functional block diagram illustrating a configuration of the determination apparatus according to the embodiment. As illustrated in FIG. 15, this determination apparatus 100 has a communication unit 110, an input unit 120, a display unit 130, a storage unit 140, and a control unit 150.

The communication unit 110 is a processing unit that executes, via the network 50, data communication with the client terminal 60 or another terminal device. The communication unit 110 is an example of a communication device. The later described control unit 150 exchanges, via the communication unit 110, data with the client terminal 60 or another terminal device.

The input unit 120 is an input device that inputs various types of information to the determination apparatus 100. For example, the input unit 120 corresponds to a keyboard and a mouse, a touch panel, or the like.

The display unit 130 is a display device that displays information output from the control unit 150. For example, the display unit 130 corresponds to a liquid crystal display, a touch panel, or the like.

The storage unit 140 has a file operation log 140a, a text table 140b, a list table 140c, threshold data 140d, and a transposition index 140e. The storage unit 140 corresponds to a storage device, such as a semiconductor memory element, like, for example, a random access memory (RAM), a read only memory (ROM), or a flash memory.

The file operation log 140a is information indicating a history of file operations. FIG. 16 is a diagram illustrating an example of a data structure of the file operation log. As illustrated in FIG. 16, this file operation log 140a associates dates and times, types, hosts, accounts, first file names, second file names, and log IDs, with one another.

The dates and times indicate the dates and times on and at which users operated the files. The types indicate types of the file operations. The hosts are information identifying terminal devices of the users who operated the files. The accounts are names of the users. The first file names and the second file names indicate names of the files. By being operated by a user, the same file may be set with a different file name. Log IDs are information uniquely identifying the file operations and information uniquely identifying the texts that were subjected to the file operations.

The text table 140b is a table holding therein texts updated and generated by file operations. FIG. 17 is a diagram illustrating an example of a data structure of the text table. As illustrated in FIG. 17, this text table 140b associates the log IDs with data of the texts. The log ID of the text table 140b corresponds to the log ID of the file operation log 140a. For example, according to the first line of the file operation log 140a in FIG. 16, the type of file operation is "update" and the log ID is "L101". Data of this updated text are the data of the text associated with the log ID, "L101", in the text table 140b.

The list table 140c is a table holding therein an FP of each text included in the text table 140b. FIG. 18 is a diagram illustrating an example of a data structure of the list table. As illustrated in FIG. 18, this list table 140c associates the log IDs with the lists (FPs). The log ID corresponds to the log ID of the text table 140b. The list is information corresponding to the FP, and has plural hash values. Each hash value is a hash value of a feature extracted from the text. In the example illustrated in FIG. 18, an eight-digit hash value corresponds to one feature. A feature indicates, as described above, an arrangement of keywords included in the text. The list corresponding to the log ID, "L101", in the text table 140b is the list corresponding to the log ID, "L101", in the list table 140c.

As described with reference to FIG. 11 and the like, features included in a list of the list table 140c are obtained as a result of deleting features L-L from all of the features. That is, over the entire area of the text, the later described control unit 150 deletes the features L-L such that a certain number of features will remain in a certain range. For example, if there is a certain range where the number of features is less than a certain number when the determination apparatus 100 deletes all of the features L-L, the determination apparatus 100 will not delete a part of the features L-L planned to be deleted, for that certain range.

A threshold data 104d include information of the ratio of the number of keywords H to the number of keywords L. Further, the threshold data 104d include information of the number of features to be left in the certain range. In the following description, the number of features to be left in the certain range will be referred to as "feature count threshold".

The transposition index 140e is information indicating a relation between a feature and texts having the feature. FIG. 19 is a diagram illustrating an example of a data structure of the transposition index. As illustrated in FIG. 19, this transposition index 140e associates validity graphs with log IDs. Respective values of the validity graphs correspond to hash values of the features. The log IDs correspond to the log IDs in the list table 140c. For example, the first line in FIG. 19 illustrates that log IDs of texts having the feature, "48742842", are "L101" and "L103".

The control unit 150 has a reception unit 150a, a feature extraction unit 150b, a similarity determination unit 150c, and a retrieval result notification unit 150d. The retrieval result notification unit 150d is an example of a retrieval unit. The control unit 150 corresponds to an integrated device, such as, for example, an application specific integrated circuit (ASIC) or a field programmable gate array (FPGA). Further, the control unit 150 corresponds to an electronic circuit, such as a central processing unit (CPU) or a micro processing unit (MPU).

The reception unit 150a is a processing unit that receives various types of information from the client terminal 60 or an information device or the like in the company. For example, when the reception unit 150a receives information of an FP of a retrieval file from the client terminal 60, the reception unit 150a outputs the received information of the FP of the retrieval file to the similarity determination unit 150c. If the reception unit 150a receives the file operation log 140a, the text table 140b, and the threshold data 140d from the information device in the company, the reception unit 150a stores the respective pieces of received information 140a, 140b, and 140d into the storage unit 140.

The feature extraction unit 150b is a processing unit that generates the list table 140c by extracting features from each text in the text table 140b, and making the extracted features into hashes. Further, based on the list table 140c, the feature extraction unit 150b generates the transposition index 140e.

When the feature extraction unit 150b generates the list table 140c, over the whole area of the text, by deleting features L-L such that features with a count equal to or greater than the feature count threshold remain in a certain range, to thereby reduce the amount of data in the list table 140c.

Hereinafter, an example of processing by the feature extraction unit 150b will be described. The feature extraction unit 150b obtains a text from the text table 140b and scans the obtained text to extract keywords therefrom. The feature extraction unit 150b extracts arrangements of respective keywords as features of the text. By making each keyword forming a feature into a hash, the feature extraction unit 150b makes the features into hashes. The feature extraction unit 150b generates a list for the text by listing the hash values of the respective features.

Further, the feature extraction unit 150b counts the numbers of appearances of the keywords included in the text. The feature extraction unit 150b classifies, based on the number of appearances of each keyword and the ratio of the threshold data 140d, the keyword as a keyword H or a keyword L. For example, if the ratio is "X:Y", the feature extraction unit 150b classifies the respective keywords such that the ratio of the number of keywords H to the number of keywords L becomes "X:Y".

The feature extraction unit 150b identifies, based on a result of the classification of keywords and pairs of keywords forming the features, features that are features L-L, from the plural features. For example, the feature extraction unit 150*b* identifies a feature having both of their keywords classified as keywords L, as a feature L-L.

The feature extraction unit 150*b* sets a certain range in the text, and determines, if features L-L are deleted from features included in the certain range, whether or not the number of features in the certain range becomes equal to or greater than the feature count threshold. Hereinafter, processing by the feature extraction unit 150*b* will be described separately for a case where the number of features in the certain range becomes equal to or greater than the feature count threshold and a case where the number of features in the certain range becomes less than the feature count threshold.

The case where the number of features in the certain range becomes equal to or greater than the feature count threshold will now be described. In this case, the feature extraction unit 150*b* executes a process of deleting values corresponding to all of features L-L included in the certain range, from the list of the text.

The case where the number of features in the certain range becomes less than the feature count threshold will now be described. In this case, the feature extraction unit 150*b* identifies features L-L not to be deleted, from the features L-L. The feature extraction unit 150*b* deletes remaining features L-L excluding the features L-L not to be deleted, from the features L-L included in the certain range, from the list of the text.

An example of the process of identifying, by the feature extraction unit 150*b*, the features L-L not to be deleted, will be described. For example, as described with reference to FIG. 12, the feature extraction unit 150*b* identifies, from all of the features L-L, features L-L having the large numbers of appearances of their pairs of keywords L, as the features L-L not to be deleted. For example, based on a total value of the numbers of appearances of the respective keywords L forming the features L-L, the respective features L-L are arranged in descending order of the total values of the numbers of appearances, and a predetermined number of features L-L that are at the top of the arranged features L-L are regarded as the features L-L not to be deleted.

The feature extraction unit 150*b* repeatedly executes the above processing by shifting the position of the certain range for that text. Further, by executing the same processing for other texts, the feature extraction unit 150*b* deletes features L-L from the lists of the remaining texts. The feature extraction unit 150*b* registers the lists resulting from the deletion of the features L-L in the list table 140*c*.

The feature extraction unit 150*b* sets values of the lists included in the list table 140*c* in the validity graphs of the transposition index 140*e* and sets the log IDs having the values of the lists in the log IDs of the transposition index 140*e*, to thereby generate the transposition index 140*e*.

Figure 20:
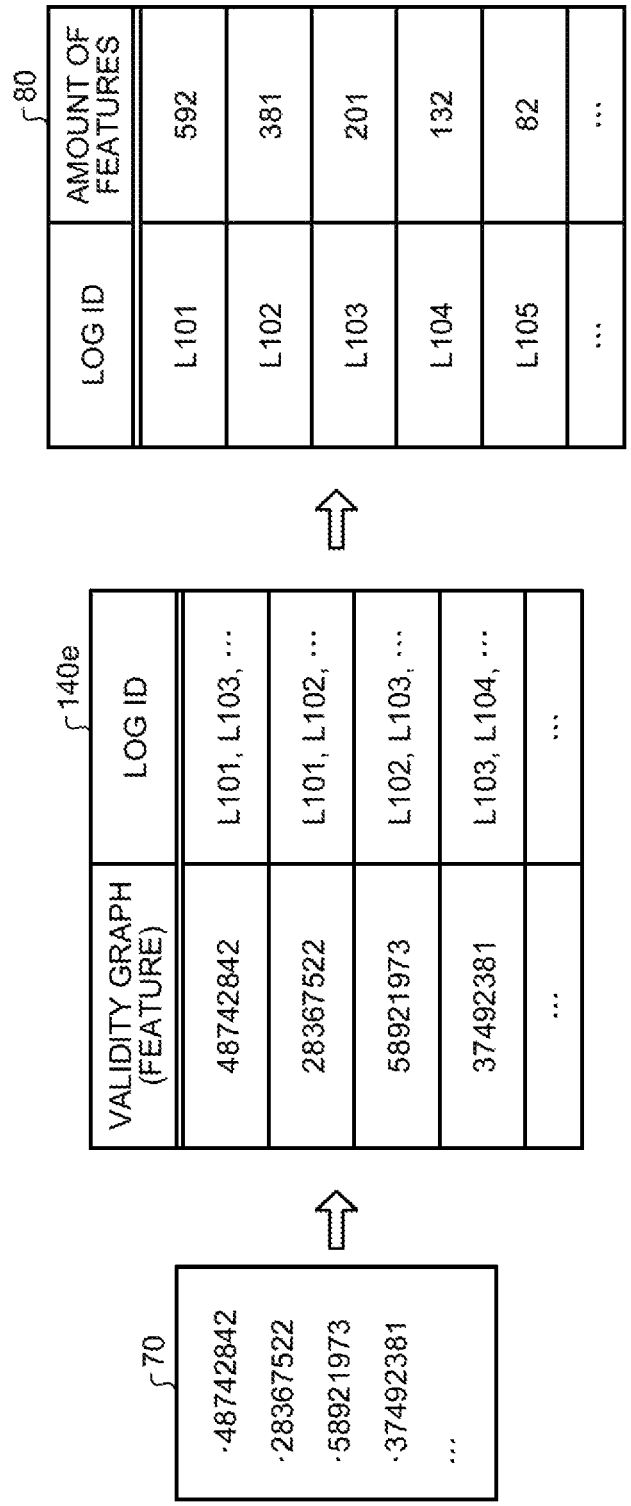
FIG. 20 is a diagram illustrating an example of processing by a similarity determination unit.

The similarity determination unit 150*c* is a processing unit that determines a log ID similar to the FP of the retrieval file by comparing the information of the FP of the retrieval file with the transposition index 140*e*. FIG. 20 is a diagram illustrating an example of processing by the similarity determination unit. In FIG. 20, the reference number, "70", indicates an FP of a retrieval file. Each feature included in the FP 70 is a hash value calculated from an arrangement of keywords included in a text of the retrieval file. The transposition index 140*e* corresponds to the transposition index 140*e* described with reference to FIG. 19.

When the FP 70 is compared with the transposition index 140*e*, a comparison result 80 is obtained. For example, the comparison result 80 associates log IDs with amounts of features. The log IDs correspond to the log IDs in the file operation log 140*a* and the text table 140*b*. The amount of features represents the number of features in the features included in the text corresponding to the log ID, the number of features matching the FP 70 of the retrieval file, and the greater the amount of features is, the higher the similarity is. The similarity determination unit 150*c* outputs any log ID having an amount of features equal to or greater than a threshold to the retrieval result notification unit 150*d*.

The retrieval result notification unit 150*d* is a processing unit that identifies log information corresponding to the log ID output from the similarity determination unit 150*c* and notifies the client terminal 60 of the identified log information as a retrieval result. For example, the retrieval result notification unit 150*d* compares the log ID with the file operation log 140*a* to extract a record corresponding to the log ID, and obtains the extracted record as the retrieval result.

FIG. 21 is a diagram illustrating an example of the retrieval result. As illustrated in FIG. 21, this retrieval result associates accounts, files names, similarities, types, and dates and times with one another. Description related to the accounts, file names, types, and dates and times is the same as the description related to the accounts, first and second file names, types, and dates and times described with reference to FIG. 16. The similarity indicates the similarity between the FP of the retrieval file and the FP of a text corresponding to the log ID. For example, the retrieval result notification unit 150*d* calculates the similarity based on Equation (1).

$$\text{Similarity} = \frac{\text{(The Number of Features Matching Between Features of FP of Retrieval File and Features of FP of Text Corresponding to Log ID)}}{\text{(Number of Features of FP of Retrieval File)}} \quad (1)$$

The retrieval result notification unit 150*d* may calculate the similarity by a method not using Equation (1). For example, the similarity may be calculated by using a calculation formula that increases the similarity corresponding to the log ID more when the amount of features illustrated in FIG. 20 is larger.

Figure 22:
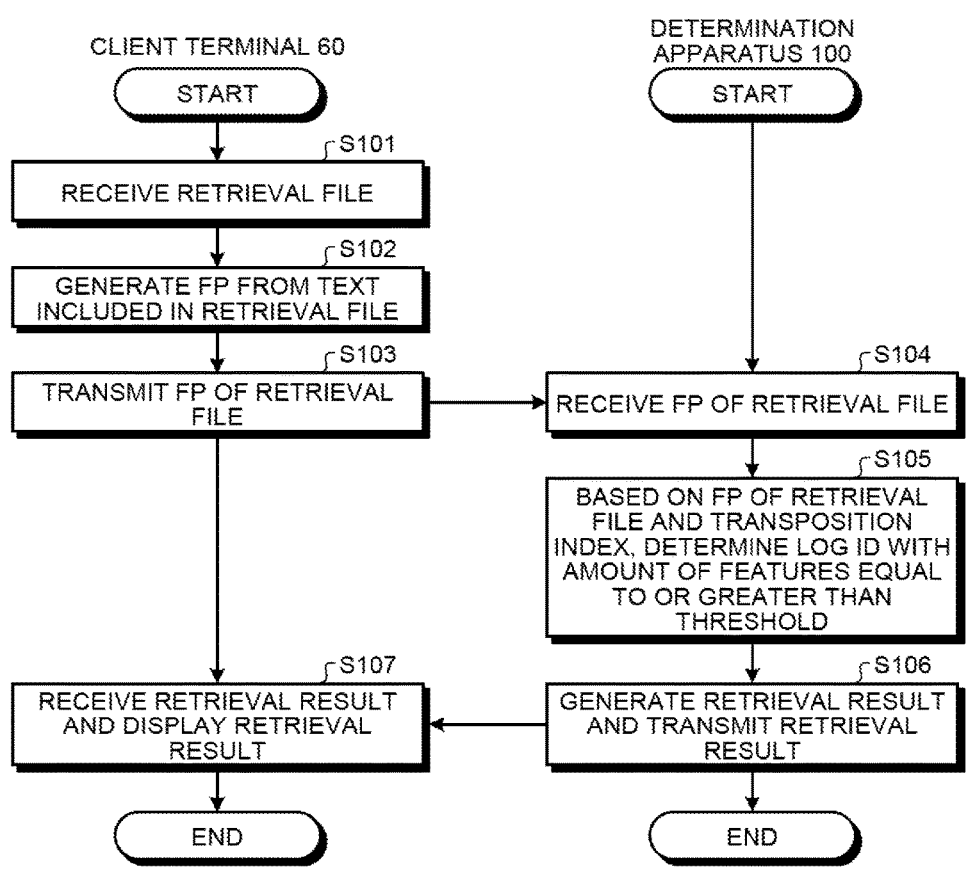
FIG. 22 is flow chart illustrating a procedure by the system according to the embodiment.

Next, an example of a procedure by the system according to the embodiment will be described. FIG. 22 is a flow chart illustrating the procedure by the system according to the embodiment. As illustrated in FIG. 22, the client terminal 60 receives a retrieval file (Step S101), and generates an FP from a text included in the retrieval file (Step S102). The client terminal 60 transmits the FP of the retrieval file to the determination apparatus 100 (Step S103).

The determination apparatus 100 receives the FP of the retrieval file from the client terminal 60 (Step S104). The determination apparatus 100 compares the FP of the retrieval file with the transposition index 40*e* and determines a log ID having an amount of features equal to or greater than the threshold (Step S105).

The determination apparatus 100 generates, based on the determined log ID and the file operation log 140*a*, a retrieval result, and transmits the retrieval result to the client terminal 60 (Step S106). The client terminal 60 receives the retrieval result and displays the retrieval result (Step S107).

Figure 23:
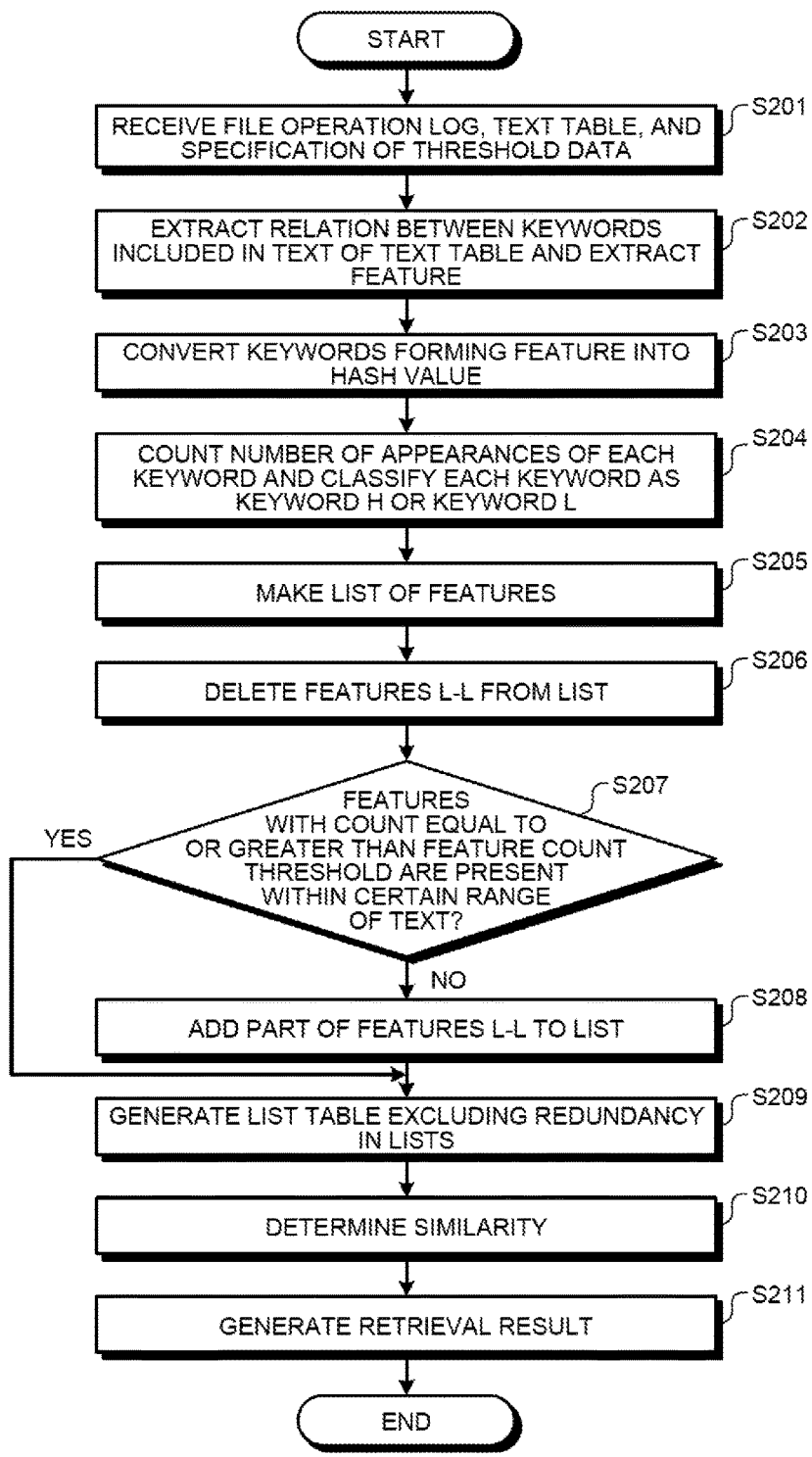
FIG. 23 is flow chart illustrating a procedure by the determination apparatus according to the embodiment.

Next, an example of a procedure by the determination apparatus according to the embodiment will be described. FIG. 23 is a flow chart illustrating the procedure by the determination apparatus according to the embodiment. As illustrated in FIG. 23, the reception unit 150*a* of the determination apparatus 100 receives the file operation log 140*a*, the text table 140*b*, and the threshold data 140*d* (Step S201).

The feature extraction unit 150*b* of the determination apparatus 100 extracts relations among respective keywords included in texts of the text table 140*b* to extract their features (Step S202). The feature extraction unit 150*b* converts the keywords forming the features into hash values (Step S203). The feature extraction unit 150*b* counts the number of appearances of each keyword, and classifies each keyword as a keyword H or a keyword L (Step S204).

The feature extraction unit 150*b* lists features for each text (Step S205). The feature extraction unit 150*b* deletes features L-L from the lists (Step S206). The feature extraction unit 150*b* determines whether or not features with a count equal to or greater than the feature count threshold are present within a certain range of a text (Step S207). At Step S207, for example, the feature extraction unit 150*b* determines whether or not features with a count equal to or greater than the feature count threshold will be present in the certain range of the text if the features L-L are deleted from the text. It is assumed that features on a list and features in a text are associated with each other respectively. For example, if a feature of a list is deleted, a feature in a text corresponding to that deleted feature is deleted.

If features with a count equal to or greater than the feature count threshold are present within the certain range of the text (Step S207: Yes), the feature extraction unit 150*b* proceeds to Step S209. On the contrary, if features with a count equal to or greater than the feature count threshold are not present within the certain range of the text (Step S207: No), the feature extraction unit 150*b* adds a part of the features L-L to the list (Step S208).

The feature extraction unit 150*b* generates the list table 140*c* with redundancy in the lists having been removed (Step S209). The similarity determination unit 150*c* of the determination apparatus 100 determines similarity by comparing the transposition index 140*e* with the FP of the retrieval file (Step S210). Based on a result of the determination of similarity, the retrieval result notification unit 150*d* of the determination apparatus 100 generates a retrieval result (Step S211).

Figure 24:
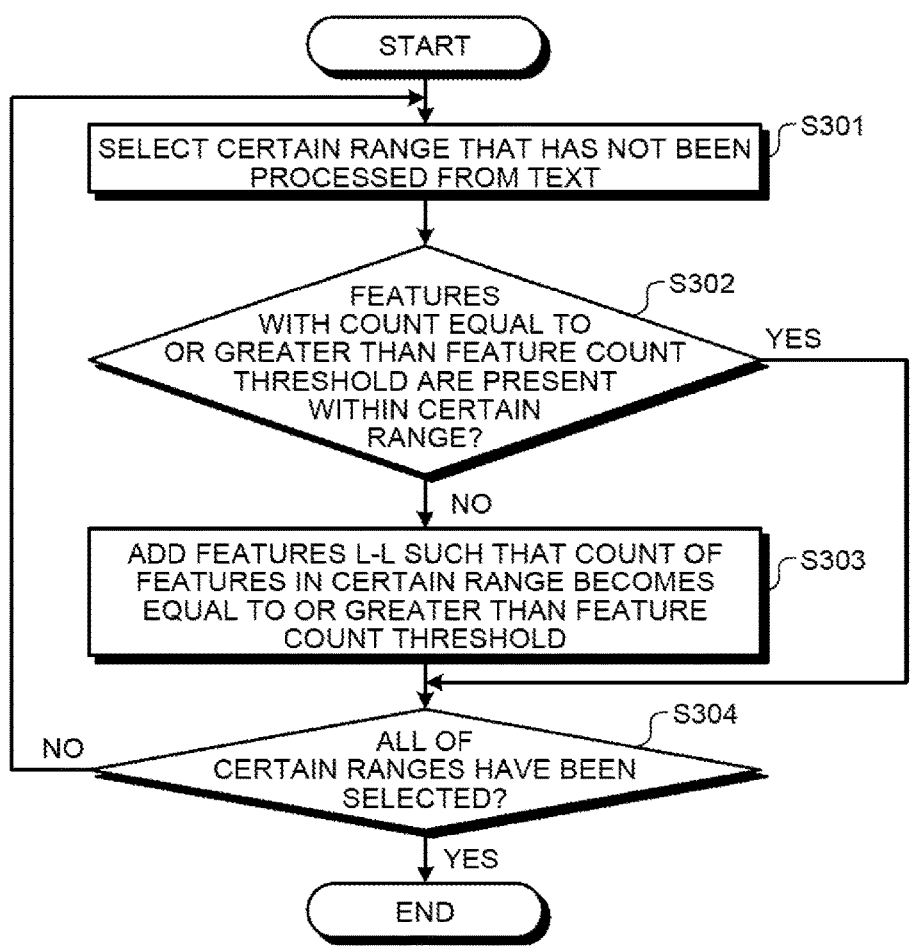
FIG. 24 is a flow chart specifically illustrating procedures of Steps S207 and S208.

Next, processing of Steps S207 and S208 in FIG. 23 will be described specifically. FIG. 24 is a flow chart specifically illustrating procedures of Steps S207 and S208. As illustrated in FIG. 24, the feature extraction unit 150*b* selects a certain range that has not been processed from a text (Step S301). The feature extraction unit 150*b* determines whether or not features with a count equal to or greater than the feature count threshold are present within the certain range (Step S302). If features with a count equal to or greater than the feature count threshold are present within the certain range (Step S302: Yes), the feature extraction unit 150*b* proceeds to Step S304.

On the contrary, if features with a count equal to or greater than the feature count threshold are not present within the certain range (Step S302: No), the feature extraction unit 150*b* adds features L-L such that the number of features in the certain range will be equal to or greater than the feature count threshold (Step S303). The feature extraction unit 150*b* determines whether or not all of ranges to be matched have been selected (Step S304).

If all of the certain ranges have not been selected (Step S304: No), the feature extraction unit 150*b* proceeds to Step S301. On the contrary, if all of the certain ranges have been selected (Step S304: Yes), the feature extraction unit 150*b* ends the processing illustrated in FIG. 24.

Figure 25:
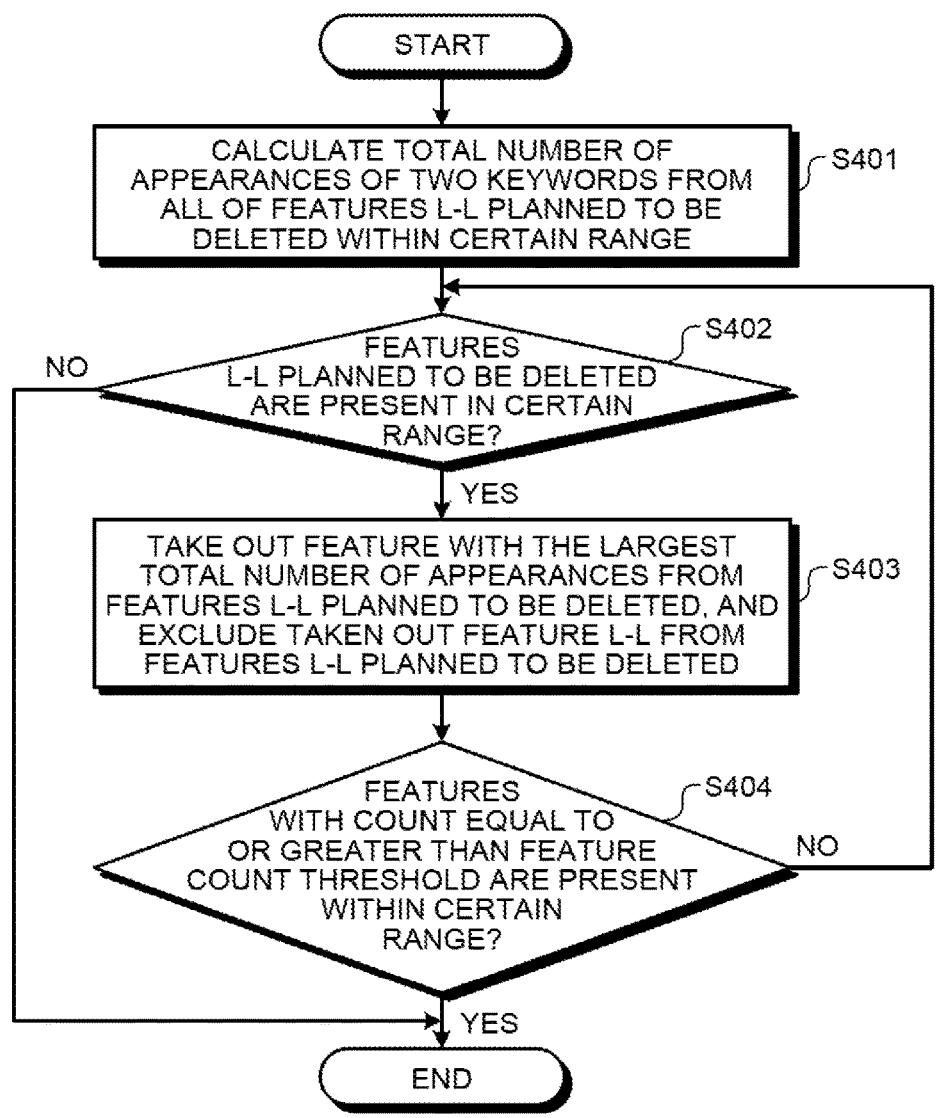
FIG. 25 is a flow chart specifically illustrating a procedure of Step S303.

Next, the processing of Step S303 in FIG. 24 will be described specifically. FIG. 25 is a flow chart specifically illustrating a procedure of Step S303. As illustrated in FIG. 25, the feature extraction unit 150*b* calculates a total number of appearances of two keywords, from all of features L-L planned to be deleted within the certain range (Step S401).

The feature extraction unit 150*b* determines whether or not features L-L planned to be deleted are present in the certain range (Step S402). If features L-L planned to be deleted are not present in the certain range (Step S402: No), the feature extraction unit 150*b* ends the processing illustrated in FIG. 25.

On the contrary, if features L-L planned to be deleted are present in the certain range (Step S402: Yes), the feature extraction unit 150*b* takes out one feature L-L having the greatest total number of appearances of keywords from the features L-L planned to be deleted, and excludes the feature L-L taken out, from the target to be deleted (Step S403). The feature extraction unit 150*b* determines whether or not features with a count equal to or greater than the feature count threshold are present within the certain range (Step S404).

If features with a count equal to or greater than the feature count threshold are present within the certain range (Step S404: Yes), the feature extraction unit 150*b* ends the processing illustrated in FIG. 25. On the contrary, if features with a count equal to or greater than the feature count threshold are not present within the certain range (Step S404: No), the feature extraction unit 150*b* proceeds to Step S402.

Next, effects of the determination apparatus 100 according to the embodiment will be described. The determination apparatus 100 executes a process of deleting features L-L for each text, under a condition where the number of features included in a certain range of the text is equal to or greater than a certain number. Further, the determination apparatus 100 determines a similarity by comparing features of a retrieval file with features of each text. Since features with a count equal to or greater than the certain number are included in the certain range of the text, similarity determination is able to be executed with features specific to each text remaining therein. Therefore, the amount of data is able to be reduced without reduction in accuracy of similarity determination.

Further, when the features L-L are deleted from the text, the determination apparatus 100 preferentially removes features L-L having the large numbers of appearances of the keywords L forming the features L-L from the target to be deleted. By executing this processing, minimum partial features are able to be saved with the overall features of the text remaining therein.

Further, the retrieval result notification unit 150*d* of the determination apparatus 100 identifies log information corresponding to a log ID output from the similarity determination unit 150*c* and notifies the client terminal 60 of the identified log information as a retrieval result. Thereby, notification of a history of operations on a text similar to a retrieval file becomes possible, and details leading to the information leakage are able to be grasped.

Although the case where the determination apparatus 100 has the feature extraction unit 150*b* and the similarity determination unit 150*c* has been described in this embodiment, limitation is not made thereto. For example, a client in the company may include a function corresponding to the feature extraction unit 150*b* and a server may include a function corresponding to the similarity determination unit 150*c*, so that the functions are divided.

Figure 26:
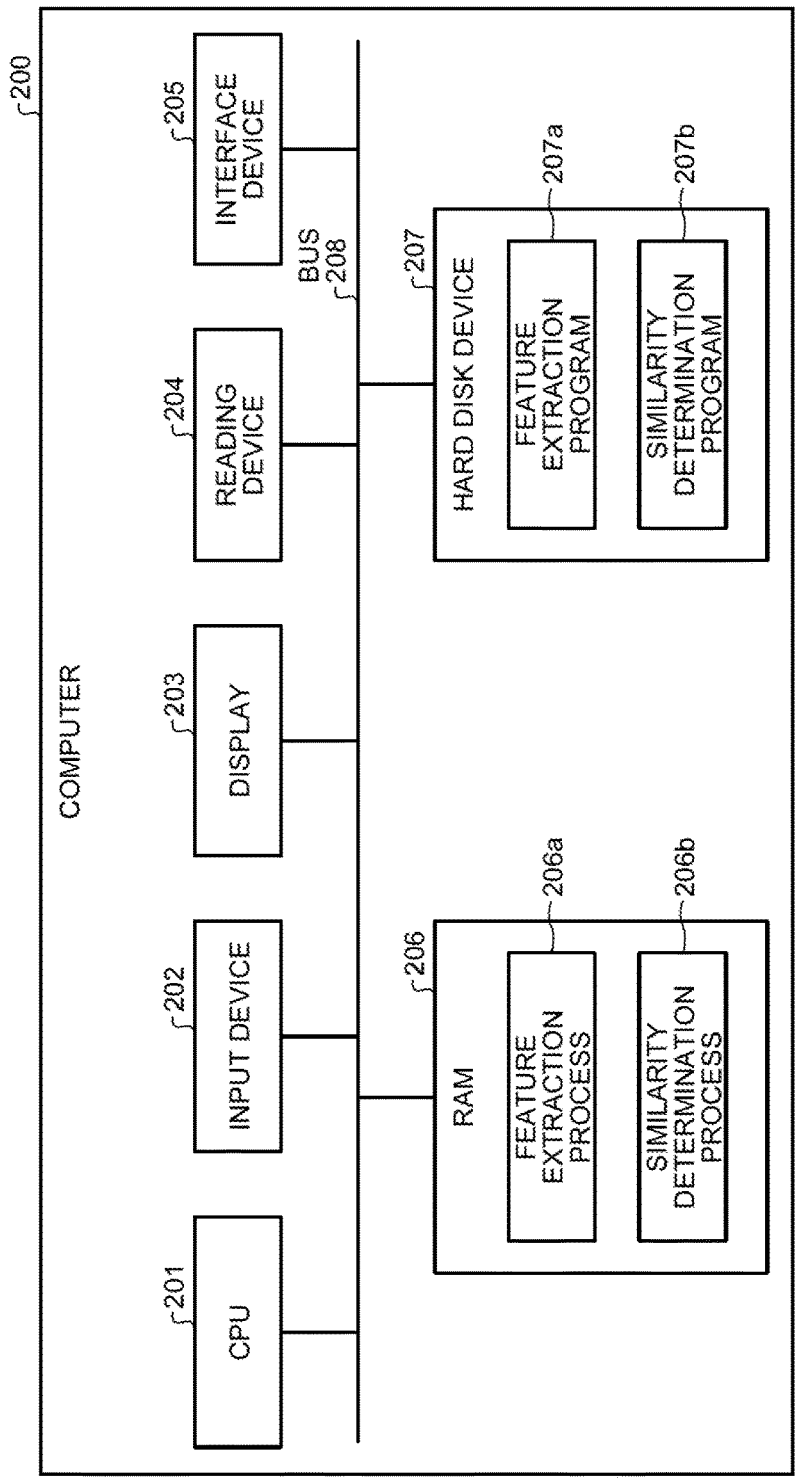
FIG. 26 is a diagram illustrating an example of a computer that executes a determination program.
Figure 27:
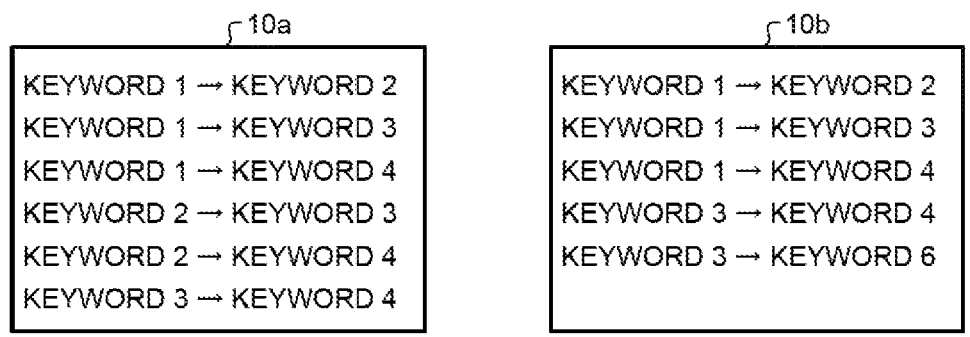
FIG. 27 is a diagram illustrating FP.
Figure 28:
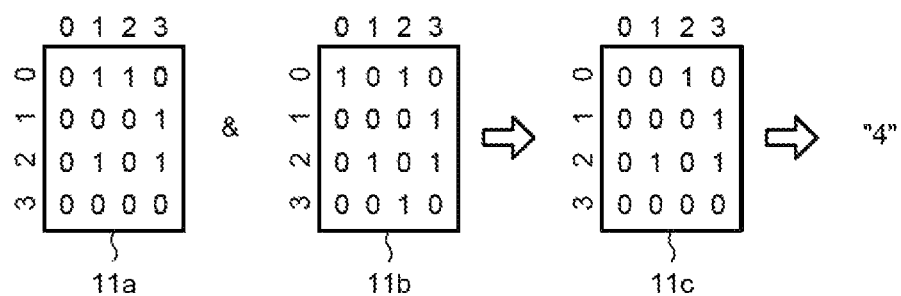
FIG. 28 is a diagram illustrating an example of a process of determining a similarity with validity graphs of n×n.
Figure 29:
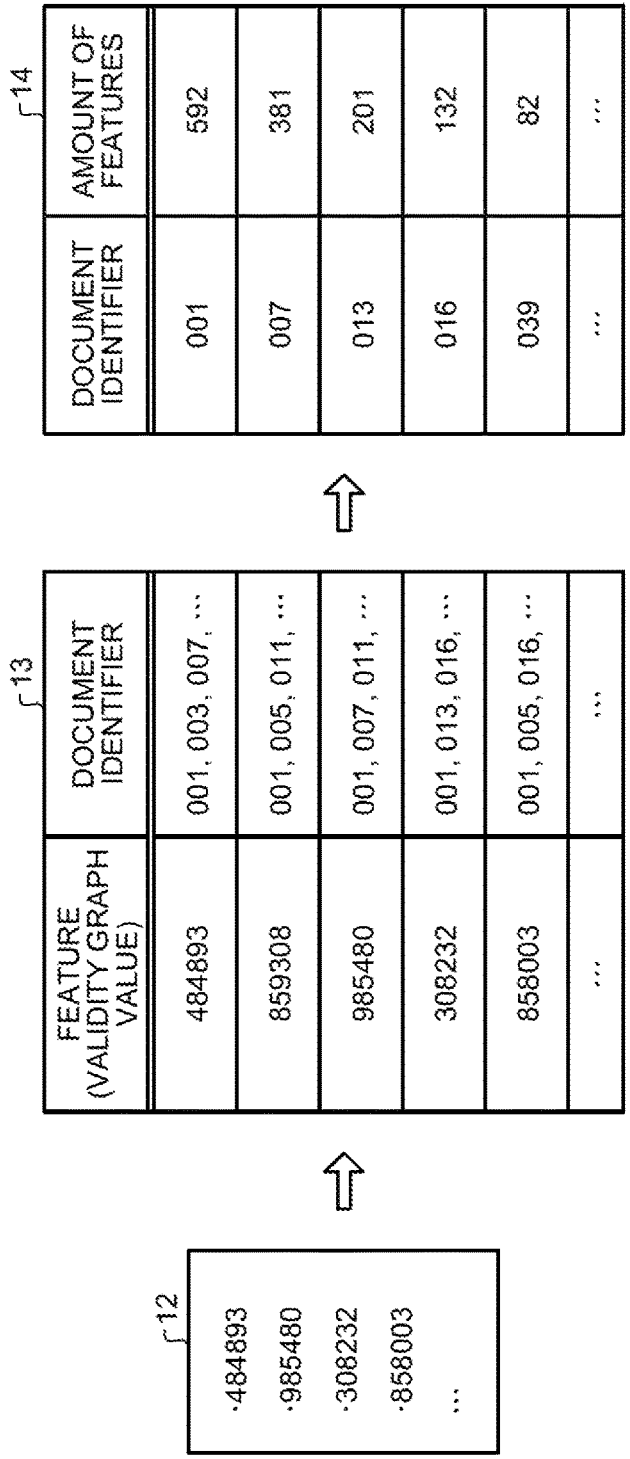
FIG. 29 is a diagram illustrating comparison by use of a transposition index.

Next, an example of a computer that executes a determination program realizing functions that are the same as those of the determination apparatus described in the above embodiment will be described. FIG. 26 is a diagram illustrating the example of the computer that executes the determination program.

As illustrated in FIG. 26, a computer 200 has a CPU 201 that executes various types of arithmetic processing, an input device 202 that receives input of data from a user, and a display 203. Further, the computer 200 has a reading device 204 that reads a program or the like from a storage medium, and an interface device 205 that transfers data to and from another computer via a network. Further, the computer 200 has a RAM 206 that temporarily stores therein various types of information, and a hard disk device 207. Further, each of these devices 201 to 207 is connected to a bus 208.

The hard disk device 207 reads out a feature extraction program 207a and a similarity determination program 207b and expands them into the RAM 206. The feature extraction program 207a functions as a feature extraction process 206a. The similarity determination program 207b functions as a similarity determination process 206b. For example, the feature extraction process 206a corresponds to the feature extraction unit 150b.

The feature extraction program 207a and the similarity determination program 207b are not necessarily stored in the hard disk device 207 from the beginning. For example, each program is stored in a "portable physical medium", such as a flexible disk (FD), a CD-ROM, a DVD disk, a magneto-optical disk, or an IC card, which is inserted in the computer 200. The computer 200 may read out and execute the feature extraction program 207a and the similarity determination program 207b therefrom.

An amount of data is able to be reduced without reduction in determination accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A similarity determination apparatus, comprising:
  a processor that executes a process comprising:
    extracting from a document a plurality of keyword arrangements that respectively include pairs of keywords;
    calculating features that respectively correspond to the plurality of keyword arrangements;
    counting a number of appearances of each of the keywords included in the document;
    grouping the keywords into either of a first group or a second group, based on the number of appearances, and grouping into a third group a pair of keywords both of which belong to the second group;
    calculating for each of pairs of keywords belonging to the third group a total of a number of appearances of one keyword in a pair of keywords and a number of appearances of another keyword in the pair of keywords;
    deleting from features that are included in a certain range within the document a feature corresponding to a pair of keywords belonging to the third group, the total of the pair of keywords being low compared with other totals for pairs of keywords belonging to the third group, while keeping a number of features within the certain range equal to or greater than a predetermined threshold; and
    determining a similarity between the document and each of other documents by comparing features of the document, the features excluding the deleted feature from the calculated features, and corresponding features of each of the other documents.

2. The similarity determination apparatus according to claim 1, wherein
  the processor further executes retrieving operation history information of another document determined to be similar to the document based on the determined similarity.

3. A similarity determination method that is executed by a computer, wherein the computer executes a process comprising:
  extracting from a document a plurality of keyword arrangements that respectively include pairs of keywords, using a processor;
  calculating features that respectively correspond to the plurality of keyword arrangements, using the processor;
  counting a number of appearances of each of the keywords included in the document, using the processor;
  grouping the keywords into either of a first group or a second group, based on the number of appearances, and grouping into a third group a pair of keywords both of which belong to the second group, using the processor;
  calculating for each of pairs of keywords belonging to the third group a total of a number of appearances of one keyword in a pair of keywords and a number of appearances of another keyword in the pair of keywords, using the processor;
  deleting from features that are included in a certain range within the document a feature corresponding to a pair of keywords belonging to the third group, the total of the pair of keywords being low compared with other totals for pairs of keywords belonging to the third group, while keeping a number of features within the certain range equal to or greater than a predetermined threshold, using the processor; and
  determining a similarity between the document and each of other documents by comparing features of the document, the features excluding the deleted feature from the calculated features, and corresponding features of each of the other documents, using the processor.

4. The similarity determination method according to claim 3, wherein
  the process further includes retrieving operation history information of another document determined to be similar to the document based on the determined similarity, using the processor.

5. A computer-readable recording medium having stored therein a program that causes a computer to execute a process comprising:
  extracting from a document a plurality of keyword arrangements that respectively include pairs of keywords;
  calculating features that respectively correspond to the plurality of keyword arrangements;
  counting a number of appearances of each of the keywords included in the document;
  grouping the keywords into either of a first group or a second group, based on the number of appearances, and grouping into a third group a pair of keywords both of which belong to the second group;

calculating for each of pairs of keywords belonging to the third group a total of a number of appearances of one keyword in a pair of keywords and a number of appearances of another keyword in the pair of keywords;

deleting from features that are included in a certain range within the document a feature corresponding to a pair of keywords belonging to the third group, the total of the pair of keywords being low compared with other totals for pairs of keywords belonging to the third group, while keeping a number of features within the certain range equal to or greater than a predetermined threshold; and determining a similarity between the document and each of other documents by comparing features of the document, the features excluding the deleted feature from the calculated features, and corresponding features of each of the other documents.

6. The computer-readable recording medium according to claim 5, wherein the process further includes retrieving operation history information of another document determined to be similar to the document based on the determined similarity.

\* \* \* \* \*